United States Patent
Munich et al.

(10) Patent No.: US 6,633,671 B2
(45) Date of Patent: *Oct. 14, 2003

(54) CAMERA-BASED HANDWRITING TRACKING

(75) Inventors: Mario E. Munich, Pasadena, CA (US); Pietro Perona, Altadena, CA (US)

(73) Assignee: California Institute of Technology, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,920

(22) Filed: Jan. 28, 1999

(65) Prior Publication Data
US 2002/0028017 A1 Mar. 7, 2002

Related U.S. Application Data
(60) Provisional application No. 60/072,802, filed on Jan. 28, 1998, and provisional application No. 60/072,804, filed on Jan. 28, 1998.

(51) Int. Cl.[7] .............................. G06K 9/00; G06K 9/34; G06K 9/62
(52) U.S. Cl. ..................... 382/187; 215/123; 215/174
(58) Field of Search ............................. 382/187, 188, 382/189, 215, 229, 116, 117, 119, 123, 174; 345/173, 175, 179, 156, 157

(56) References Cited

U.S. PATENT DOCUMENTS

| | | | |
|---|---|---|---|
| 5,077,802 A | 12/1991 | Plamondon | 382/122 |
| 5,103,486 A * | 4/1992 | Grippi | 382/116 |
| 5,226,091 A | 7/1993 | Howell et al. | 382/107 |
| 5,454,046 A * | 9/1995 | Carman, II | 382/186 |
| 5,577,135 A * | 11/1996 | Grajski et al. | 382/253 |
| 5,617,312 A | 4/1997 | Iura et al. | 700/83 |
| 5,661,506 A * | 8/1997 | Lazzouni et al. | 345/179 |
| 5,745,592 A | 4/1998 | Nalwa | 382/119 |
| 5,771,036 A * | 6/1998 | Martin et al. | 345/145 |
| 5,802,200 A | 9/1998 | Wirtz | 382/119 |
| 5,878,164 A * | 3/1999 | Brown et al. | 382/190 |
| 6,044,165 A * | 3/2000 | Perona et al. | 382/103 |
| 6,052,481 A * | 4/2000 | Grajski et al. | 382/187 |
| 6,249,604 B1 * | 6/2001 | Huttenlocher et al. | 382/174 |

OTHER PUBLICATIONS

Munich et al, Visual Input for Pen–Based Computers, Aug. 1996, IEEE ISBN: 0–8186–7282–X, vol. 3, pp. 33–37.*

Vishvjit S. Nalwa; Automatic On–Line Signature Verification; Feb. 1997; Proceedings of the IEEE, vol. 85. No. 2. pp. 215–239.

* cited by examiner

*Primary Examiner*—Mehrdad Dastouri
(74) *Attorney, Agent, or Firm*—Fish & Richardson P.C.

(57) ABSTRACT

A system for processing handwriting that uses an ordinary camera as an image input device. The output of a single camera is used to produce a probability function that indicates the likelihood of whether the pen is touching the paper. The function uses clues including ink on the page and/or shadows. Another embodiment uses both pen up and pen down information to dynamically time warp-fit the information to fit it to a template.

20 Claims, 11 Drawing Sheets

Two Signatures in the Set s05

Alignment Path Between the Signatures

SIGNATURE 1

SIGNATURE 2 y(t) for Two Signatures in the Set s030 y(t) for Two Signatures in the Set s030 after DTW

Two Signatures in the Set s030

Alignment Path Between the Signatures

CAMERA-BASED HANDWRITING TRACKING

CROSS REFERENCE TO RELATED APPLICATIONS

This application claims the benefit of the U.S. Provisional Application No. 60/072,802, filed on Jan. 28, 1998, and U.S. Provisional Application No. 60/072,804, filed Jan. 28, 1998 which are incorporated herein by reference.

STATEMENT AS TO FEDERALLY SPONSORED RESEARCH

This work was supported by Grant No. EEC 9402726 and Grant No. EEC 9402726 awarded by the National Science Foundation. The government may have certain rights in this invention.

FIELD

The present invention teaches a system of using a camera to track handwriting and determine certain characteristics of the handwriting. More specifically, the present system shows a first embodiment with a monocular way of tracking the movement of the pen and also a camera-based way of identifying a person's identity.

BACKGROUND

Advances in computer technology have given rise to smaller computing systems. As the computing structure becomes smaller, the size of the keyboard and the size of the screen become a real limit on the size of the computer. For example, the laptop computer cannot be easily made smaller than the keyboard. One solution is to use data entry via handwriting. Many handwriting systems use a tablet that detects the pressure of the pen. The pressure-sensitive tablets, however, are specialized materials in themselves and take up space.

Security is an important issue in current information technology, and it is highly desirable to be able to identify a person using biometric aspects. Various people have suggested different biometric techniques, including face recognition, fingerprint recognition, iris recognition, and others.

SUMMARY

The present inventors disclose systems which use a video camera to capture the motion of the hand and translate that motion into handwriting. The principles are described in U.S. patent application Ser. No. 081,490,678, now U.S. Pat. No. 6,044,165. This system uses an image acquisition device, e.g. a camera, a writing surface, e.g., a piece of paper, and a writing implement, e.g. a normal pen, as the data entry device. The only necessary hardware that is not common is the camera. However, cameras can be made much smaller than keyboards.

During processing of the system, the inventors found that it is advantageous to determine when the pen is up and when the pen is down. One aspect of the present system describes a way of tracking when the pen is up and down using a monocular system.

Another aspect uses both the pen up and pen down strokes to form an identification technique using biometric techniques. The present system also describes a special way of verifying identity using signature verification and special features in the signature verification.

BRIEF DESCRIPTION OF THE DRAWINGS

These and other aspects of the invention will now be described with reference to the attached drawings, in which.

DESCRIPTION OF THE PREFERRED EMBODIMENT

Figure 1:
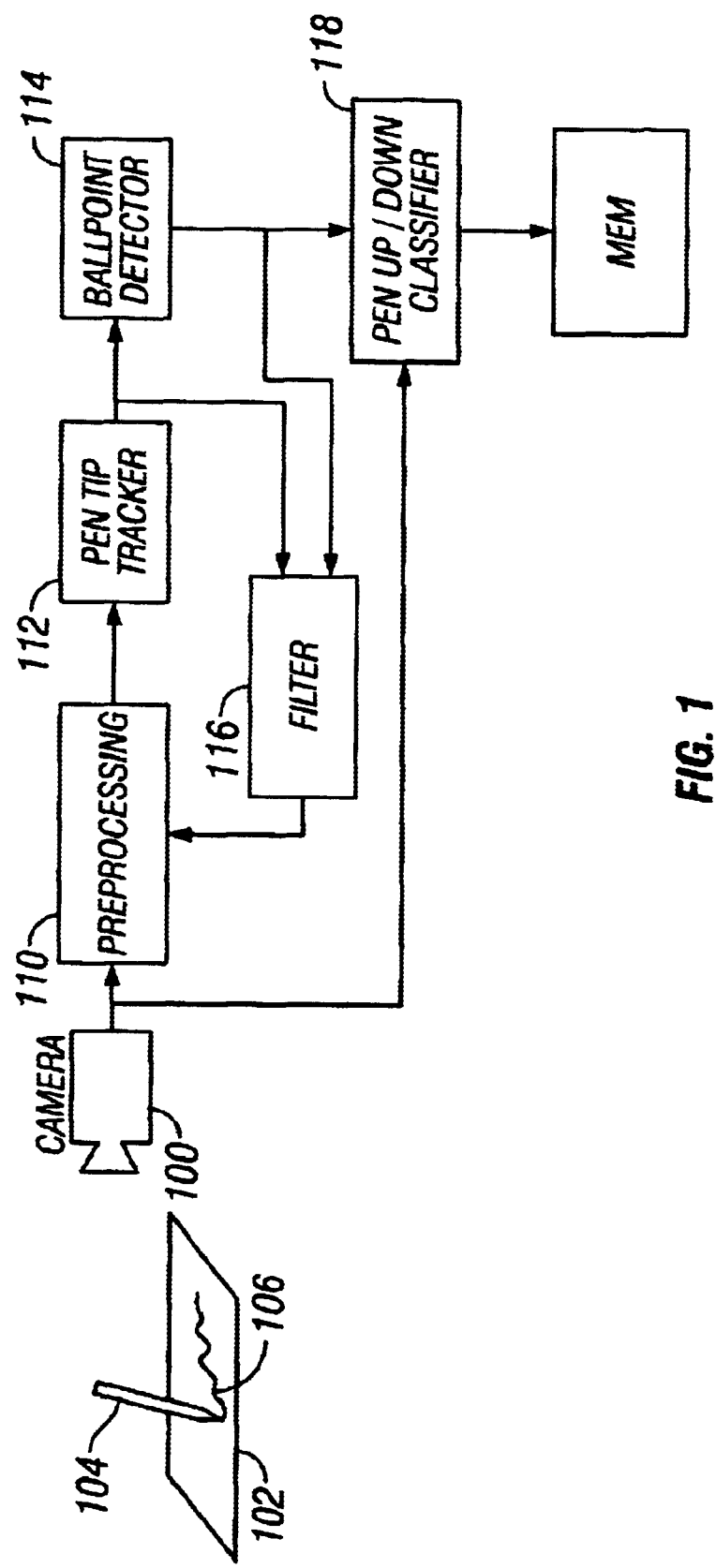
FIG. 1 shows a basic block diagram of a first embodiment.

A basic block diagram of the handwriting recognition system is shown in FIG. 1. A camera 100 is placed adjacent the paper 102, to detect the movement of the pen 104, and also preferably in a location where it can view the line 106 that is being written by the pen. The preprocessing stage uses the preprocessing block 110 to perform an initialization of the algorithm. This is done to find the position of the pen in the first frame of the sequence. By doing so, a template of the pen is acquired to use as a kernel for further processing. The preprocessing initialization can be done in at least three different ways.

In a batch analysis, the tracker can be initialized manually, by using the mouse to click on the pen tip in the first frame. An alternate way is to use a pen that is known by the system, in which a previously-stored template representing the pen tip is used. The position of the pen tip is then determined by correlation over the image to determine the desired location. If the pen type is unknown, any of different systems known in the art can be used to detect it, or the batch analysis system can be used.

Once the pen tip has been acquired, it is tracked using the pen tip tracker 112. An optimal detector can be used to find the location of the pen tip in the image. The most likely position of the pen is then given by the best match between the pen tip and the image.

Figure 2:
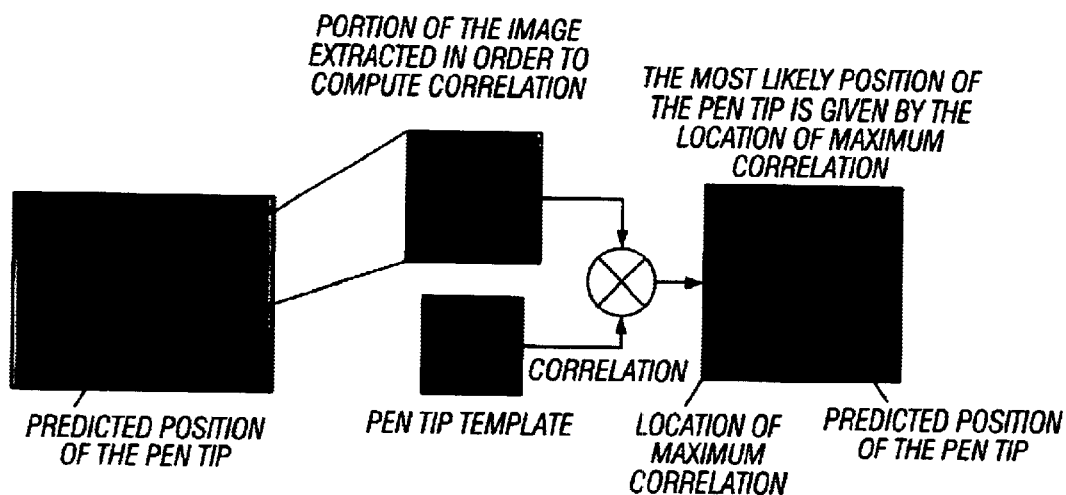
FIG. 2 shows a prediction system for predicting position of the pen tip.

FIG. 2 shows correlating over the image using the kernel obtained by the preprocessing and the assumption that changes in size and orientation of the pen tip during the sequence are small. The most likely position of the pen is taken by detecting the position of maximum correlation obtained by correlating the pen tip template and an area of the image around the predicted position of the pen tip, shown in FIG. 2.

Ballpoint detector 114 detects the ballpoint of the pen. The description given herein assumes that the pen tip shape is roughly conical. This means that its projection into the image plane will be a triangle. The pen tip tracker finds the most likely position of the centroid of the pen tip. This is the point that will be closest to the center of gravity of the triangle.

The ballpoint detection uses a first derivative of a Gaussian function as a simple edge detection mask. This finds the position and orientation of the edges of the pen tip, e.g., the sides of the mentioned triangle that are used. The distance from the ballpoint to the centroid of the pen tip, as well as the current position of the centroid is used to calculate the current expected position of the boundaries of the pen. A specified set of points on these boundaries, e.g., 5 points, are used as the centers of the edge detection window.

The system looks for points in each window that have maximum response to the edge detector at the expected orientation of the corresponding boundary.

Figure 3A:
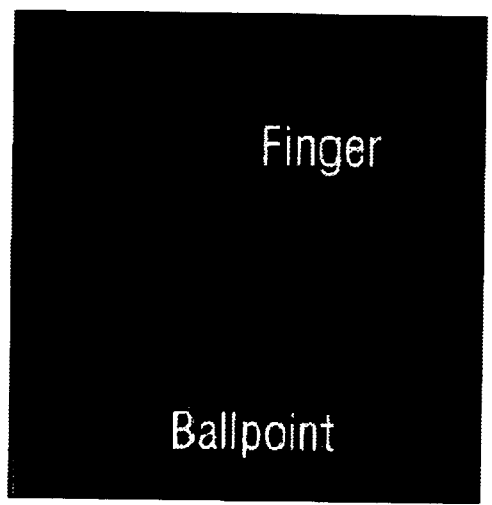
FIG. 3 shows following the centroid of the tip.
Figure 3B:
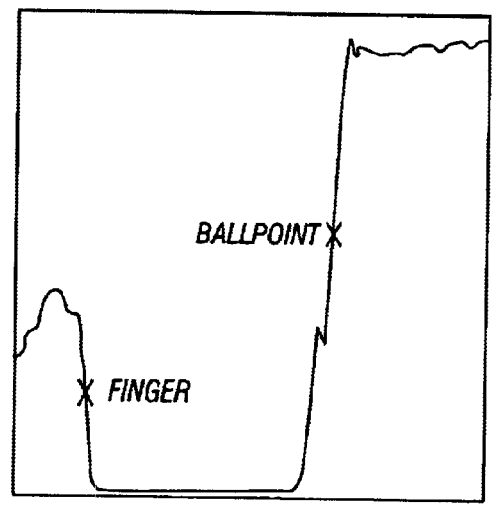

The edges are found by interpolating lines through these points. The axis of the pen tip is computed as the mean line defined by the pen edges. The profile of the image through the pen's axis is extracted in order to find the position of the ballpoint. The position of the finger along the axis of the pen tip is also extracted in order to complete the representation of the projection of the pen tip on the image plane. FIG. 3 shows the image of the pen tip, its edges, its axis, the image profile and the positions of the ballpoint and the finger. The calculation of the position of maximum edge detection response as well as the positions of the ballpoint and the finger are computed with subpixel accuracy by fitting a parabola to the corresponding response and brightness values. The profile of the image along the pen's axis is shown in FIG. 3B.

The output of the correlation-based tracker is used with filter 116, which predicts the position of the pen tip in the next frame based on an estimate of the position, velocity and acceleration of the pen tip in the current frame. This filter improves the performance of the system by allowing a reduction of the size of the neighborhood used to calculate correlation. The measurements are acquired faster and the measured trajectory will be smoothed by the noise rejection of the filter.

A Kalman Filter is a recursive estimation scheme that is suitable for this problem. The preferred system assumes a simple random walk model for the acceleration of the pen tip on the image plane. The model is given in equation 1.

$$\begin{cases} x(t) = v(t), \\ v(t) = a(t) \\ a(t) = n_a(t) \\ y(t) = x(t) + n_y(t) \end{cases} \quad (1)$$

where $x(t)$, $v(t)$ and $a(t)$ are the two dimensional-components of the position, velocity and acceleration of the tracked point, and $n_a(t)$ is the additive zero-mean, Gaussian, white noise. The state of the filter $X(t)$ includes three 2-dimensional variables, $x(t)$, $v(t)$ and $a(t)$. The output of the model $y(t)$ is the estimated position of the pen tip.

The trajectory obtained by the pen tip tracker and the filter, however, includes the total trajectory of the pen. This includes down portions (where the pen is touching the paper) and up portions (where the pen is not touching the paper). This information is inconsistent with some standard techniques to perform handwriting recognition which assume that their input data is only formed by pen-down strokes. The detection of the areas where the pen is lifted and therefore, not writing, could confuse these systems. This is accomplished by classifier 118, which uses additional information given by the ink path on the paper. The system checks for the presence of ink in the places where the pen's ballpoint was found.

The detection of ink using the brightness of the image requires certain processing issues. The image brightness at any given place varies with illumination, writers' hand position and camera's gain. Moreover, the image contrast could change from frame to frame due to light flickering and shadows. The detection of ink is done using local measurements for each point.

Figure 4:
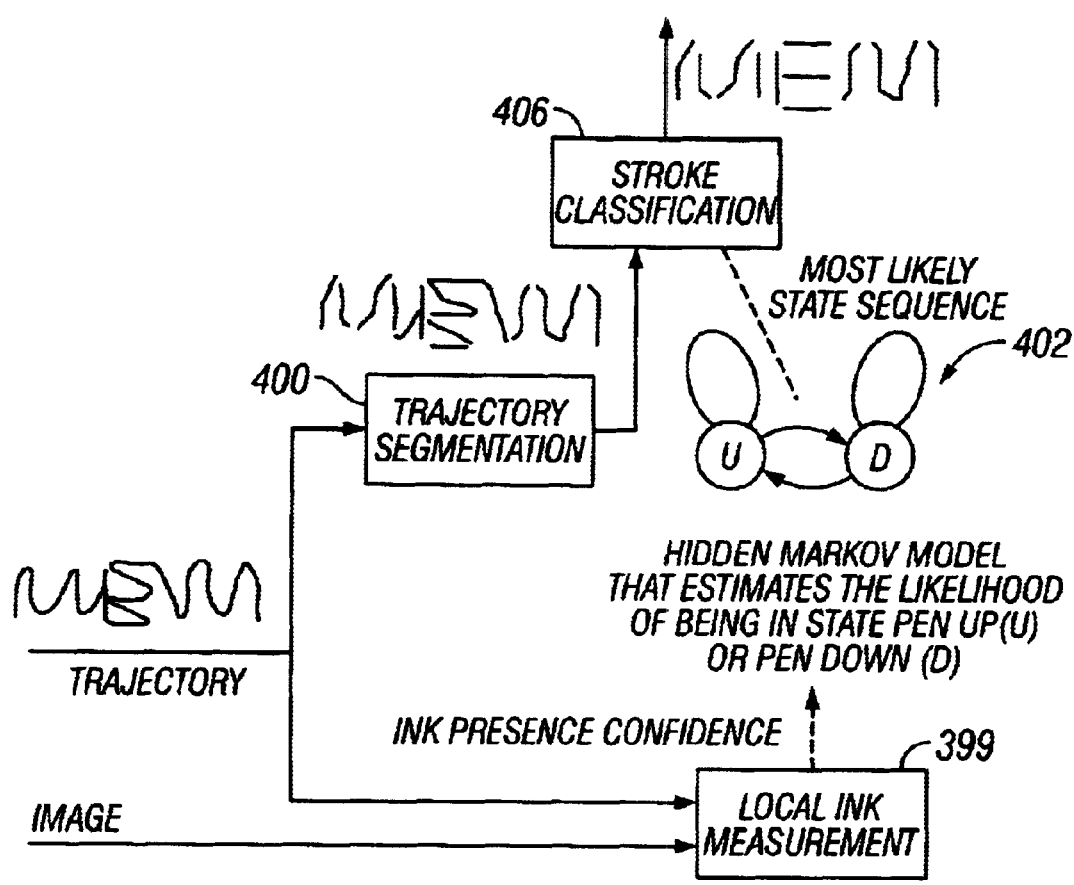
FIG. 4 shows a block diagram of the classification system.
Figure 5:
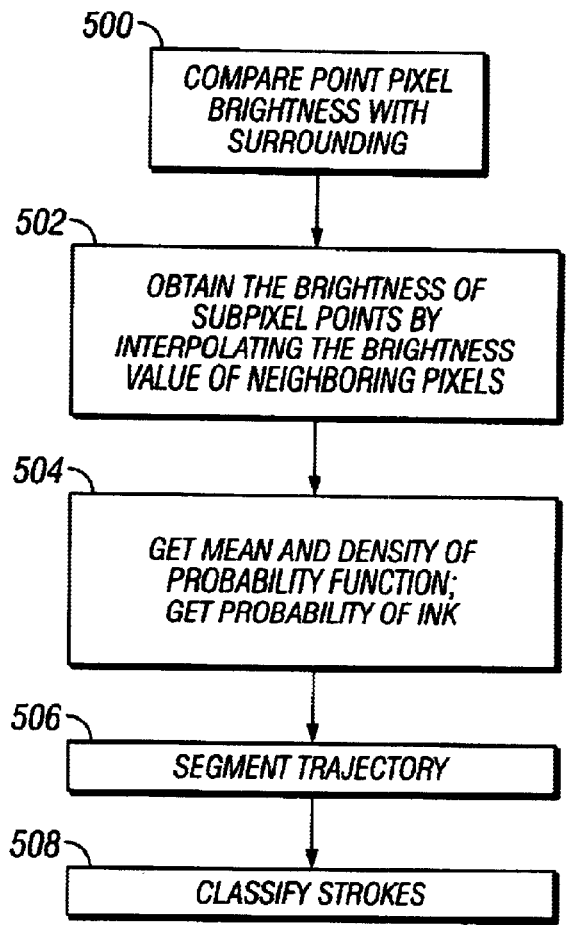
FIG. 5 shows a flowchart of the system.

FIG. 4 shows a block diagram of this subsystem which operates according to the FIG. 5 flowchart.

Figure 6:
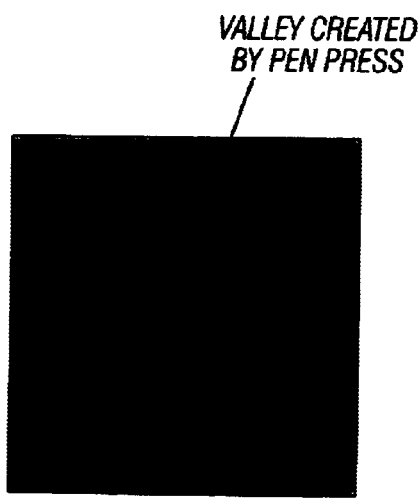
FIG. 6 shows a valley created by the pen press.

First the brightness of the pixel where the ballpoint was found is compared with the brightness of the pixels in the surrounding at step 500. The surrounding brightness on pixels are measured on a circle centered at the ballpoint position. FIG. 6 shows the positions at which the brightness is measured. The brightness of the subpixel is obtained by interpolation shown by step 502. This system measures the brightness on points on the circle centered at the ballpoint position. Since these points could fall inside the pixels, their corresponding brightness can be computed by interpolating brightnesses of neighboring pixels. The mentioned comparison should be performed in a statistically robust way in order to obtain a confidence measure that is independent of the mentioned changes in image brightness. The brightness is assumed to be a Gaussian-distributed random variable. The mean and variance of this probability density function are estimated using the measured brightness values at 502. The confidence measure is computed as the probability of the brightness found at the ballpoint, given the parameters of the probability density function at 504. If there is ink present at the ballpoint pixel, this confidence is low, close to zero. Otherwise, the confidence is high, close to one. The selection of this particular confidence measure is very convenient since it provides automatic scaling between zero and one.

The brightness often cannot be obtained until the pen tip has left the measurement area, otherwise, the ink trace will be covered by the pen tip. In the preferred system, the operation waits until the pen tip is sufficiently far away from the area of interest before completing brightness measurements.

The confidence measure is preferably used to decide whether a point likely corresponds to pen up or pen down. However, performing hard decisions based on a single measurement is very likely to fail due to noise and errors in brightness measurements. A soft-decision approach that estimates the probability of each individual point being a pen up or a pen down is more robust. A further improvement is provided by modeling the probability of transition between these two states (pen up or pen down), given the current measurement and the previous state. 402 represents a Hidden Markov Model (HMM) with two states, one corresponding to pen up and the other corresponding to pen down. This is fed by the measurement at 399. The HMM learns the probabilities of moving from one state to the other and the probabilities of outputting a particular value of confidence from a set of examples. The most likely state of the system at each point in the trajectory is estimated using Viterbi's algorithm.

FIG. 4 shows the trajectory being segmented into strokes at 400. This is done using the curvilinear velocity of the pen tip and the curvature of the trajectory. Selection of these two features was inspired by the work of Viviani and Plamondon and by the intuitive idea that on the limit points between two different handwriting strokes the velocity of the pen is very small and/or the curvature of the trajectory is very high. The set of segmentation points is the result of applying a threshold on each of the mentioned features.

The HMM estimates the most likely state of the system, e.g., pen up or pen down, at any given point in the trajectory. The sate of a HMM is a hidden variable that can be estimated based on a model of the system and random clues or measurements that one obtains. These measurements are associated in a mixture of deterministic and random ways to that state. The probability of moving from one state to another is also modeled. For example, one clue is the presence of ink. After passage of a time t, the system looks back to see if ink is present where the pen was moving. This is a strong clue that the pen was touching. Another possible clue is the shadows produced by the pen tip on the surface of the paper. For example, are there two shadows or are the shadows touching? When they are touching, the pen is likely down. However, since the system is not perfect, it may not get perfect images of either of these. Another set of clues is provided by the paper surface deformation produced by the writing. Such deformation manifests itself as a light-dark ridge or trace in the images. Yet other clues can be used. For example, thermal traces can be detected by an infrared detector. Any other alteration to the surface of the paper of any kind, can alternatively be detected.

A voting scheme assesses the likelihood of a particular stroke being a pen up or pen down also providing in this way a confidence measure on the state corresponding to each stroke. If needed, hard classification of each stroke as pen up or pen down is performed by applying a threshold on the voting results. The hard classification as well as the likelihood of pen up/down are the stroke's descriptors that the interface provides to a handwriting recognition system. The results of segmentation from 400 are obtained at 506. These are used with the probability from 402 to classify strokes at 508. Only the "down" strokes are obtained from stroke classification 406.

Hence, this system can detect pen up and pen down from a single camera, without the need for stereoscopic vision. This is done using one or many of a number of techniques like looking for a trace of ink and using shadows of the pen up and pen down or looking for some other manifestation of the other trace of the pen.

A second embodiment operates without necessarily using pen up and pen down, and in fact, operates preferably using all of the information including pen up information and pen down information. This system can be used to identify people using signature verification, so that a person can, for example, log on to a computer using their signature. Unlike previous pressure-sensitive tablet systems, this system obtains more information since it obtains the otherwise hidden part of the signature.

Identification verification involves two different tasks, (1) verification: does this signature correspond to person X's signature and/or (2) identification recognition: who is this user among the universe of different possibilities? The latter task is carried out by matching the signature with the database of possible users and indicating the existence or lack of match. There are a number of problems that need to be considered in order to carry out the matching in both cases. These include uncertainty on the starting point of the signal, non-linear stretching and squeezing of parts of the signal, and translation, rotation, and scaling of the signals.

Solutions to these problems include obtaining a very large number of signatures in order to get a characterization of the mentioned variability which would require the user, for example, to sign their name hundreds of times. This, of course, is impractical. Another alternative is to deform the signatures in known ways; to provide additional examples. A more preferred system, and the system used according to the present system, is a way of matching the signals that is relatively invariant with respect to the specified changes.

Figure 7:
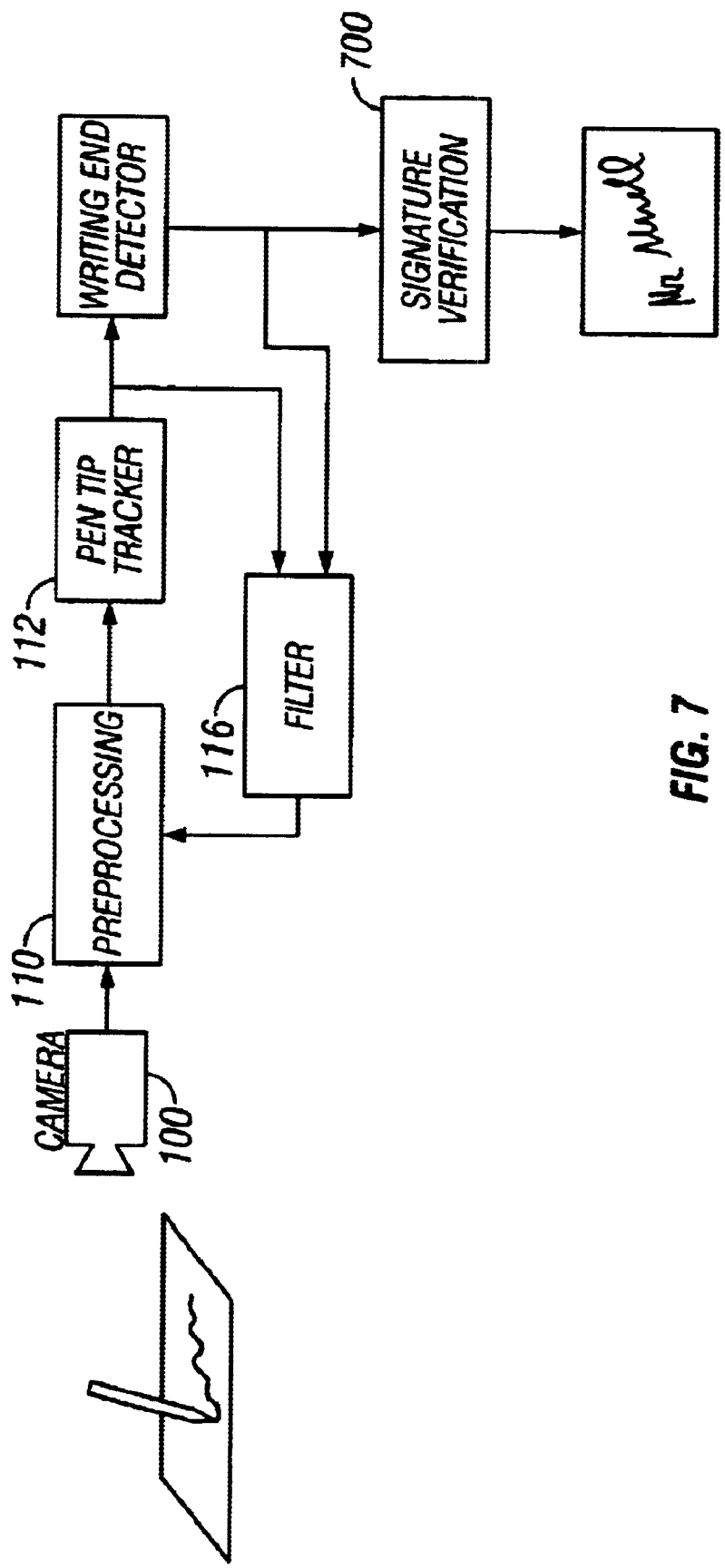
FIG. 7 shows a block diagram of a second embodiment.
Figure 8A:
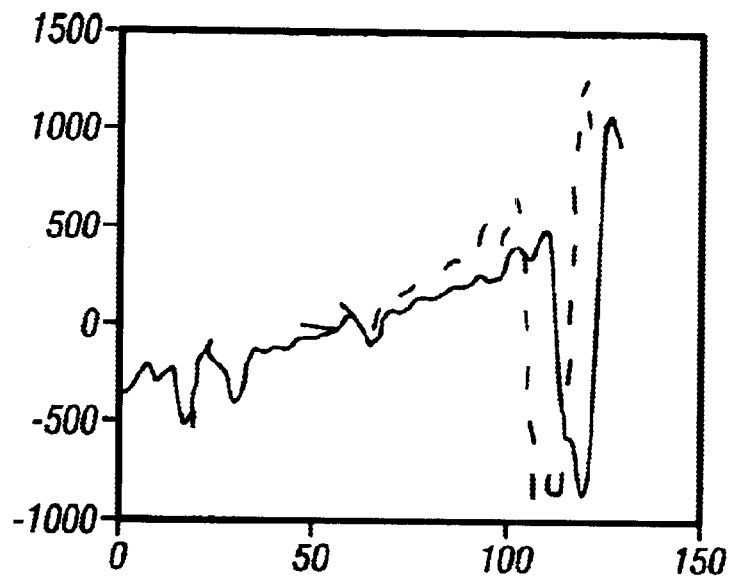
FIGS. 8–10 show different operations involving dynamic time warping of signatures for verification.
Figure 8B:
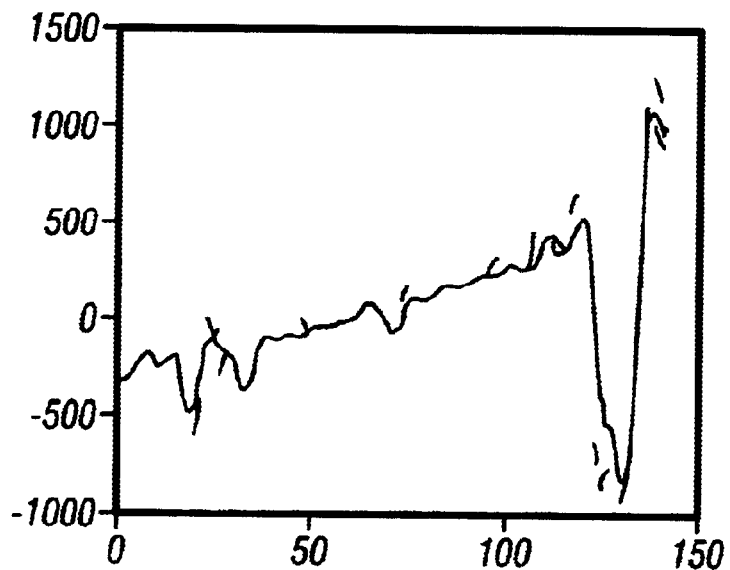
Figure 8C:
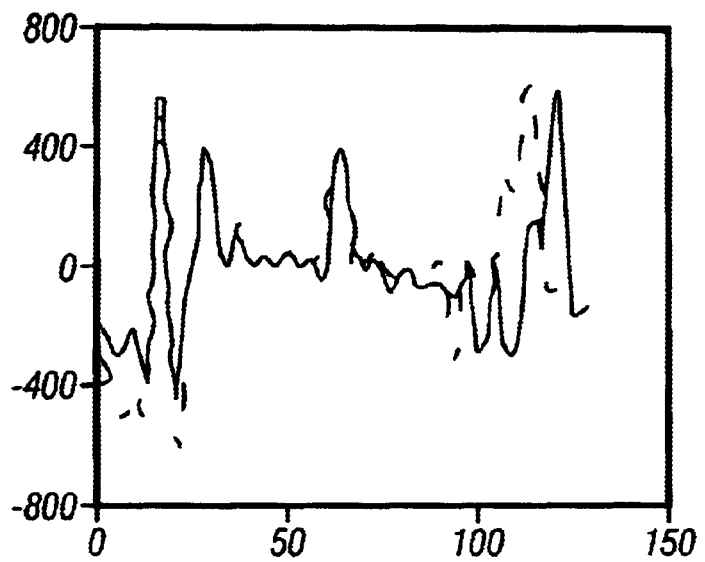
Figure 8D:
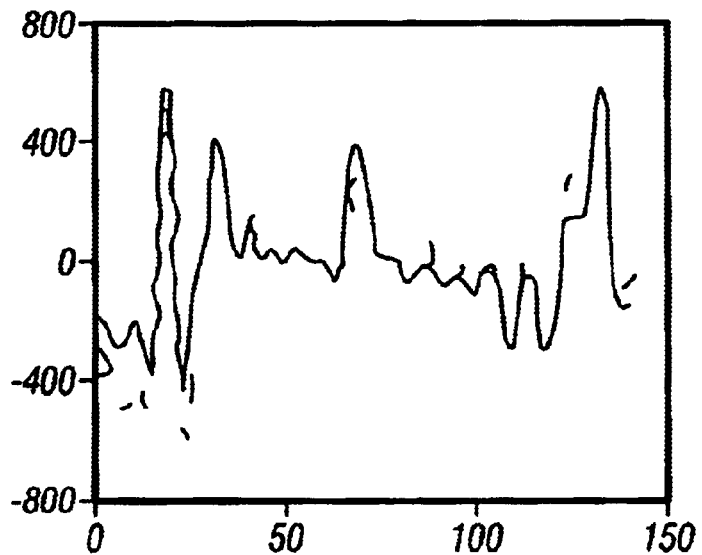
Figure 8C:
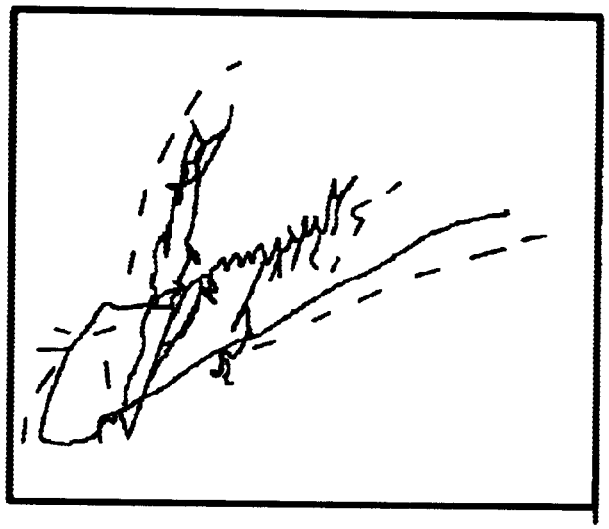
Figure 8F:
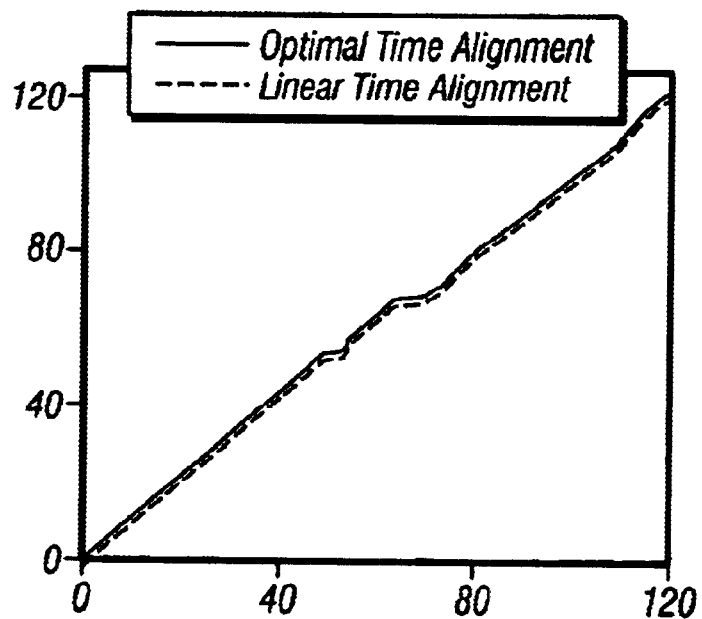

The block diagram of the system is shown in FIG. 7. This figure is almost the same as FIG. 1 of the previous embodiment, except does not use the up/down detector. The numbered blocks are otherwise similar.

The preprocessing stage 110 performs initialization of the algorithm, i.e. it finds the position of the pen in the first frame of the sequence and selects the template corresponding to the pen tip to be tracked. In subsequent frames, the preprocessing stage cuts a piece of image around the predicted position of the pen tip and feeds it into the next block.

The pen tip tracker 112 has the task of finding the position of the pen tip on each frame of the sequence. A Kalman filter 116 predicts the position of the tip in the next frame based on an estimate of the current position, velocity and acceleration of the pen. The signature verification block 700 verifies the signature.

The present system uses Dynamic Time Warping (DTW) applied to this problem. This algorithm was initially proposed in the field of Speech Recognition by Sakoe and Chiba and it is described in full extent in the book of Rabiner and Juang. In the area of signature verification, Sato and Kogure used DTW to align signature shapes, Parizeau and Plamondon compared the performance of DTW with regional correlation and skeletal tree matching for signature verification, Huang and Yan applied DTW to align signature strokes and Nalwa employed a similar dynamic programming technique to align different characteristic functions of the signature parameterized along its arc length.

Sato and Kogure proposed to use DTW in order to align the shape of signatures. However, those signatures were obtained from a conventional device, and had only pen down strokes. The results were obtained after having normalized the data with respect to translation, rotation, trend and scale. They further used the result of DTW in order to compute the alignment of the pressure function and a measure of the difference in writing motion. Finally, they performed the classification based on the residual distance between shapes after time alignment, the residual distance between pressure functions and the distance between writing motions.

Parizeau and Plamondon evaluated the use of DTW for signature verification by aligning either $x(t)$, $y(t)$, $v_x(t)$, $v_y(t)$, $a_x(t)$ or $a_y(t)$. In their work, they used the complete signing trajectories, i.e., pen down and pen up strokes. Huang and Yan presented the use of DTW for matching signature strokes by finding a warp path that minimizes the cost of aligning the shape, velocities and accelerations of the individual strokes at the same time. Pen up strokes are considered in the preprocessing phase of their algorithm, in order to be merged with the pen down strokes.

Nalwa parameterized the pen down strokes of the signature along its arc length and then compute a number of characteristic functions such as coordinates of the center of mass, torque, and moments of inertia using a sliding computational window and a moving coordinate frame. He performed a simultaneously dynamic warping over arc length of all these characteristic functions for the two signatures under comparison. A measure of the similarity of the signatures is used for classification.

The present implementation of DTW for signature verification attempts to perform the best time alignment of the two dimensional shape of the signatures. This finds the time warping function that has the minimum cost of aligning the planar curves that represent signatures. The visual tracker preferably uses the full signing trajectory including both parts from the pen being up and being down. It was noted that the pen up strokes drawn by each subject were as consistent as the pen down strokes. This observation agrees with the belief that signatures are produced as a ballistic or reflex action, without any visual feedback involved.

FIGS. 8A–8F shows examples of dynamic time warping applied to align the two dimensional shape of two signatures. The first column shows $x(t)$ before and after time warping and the second column shows $y(t)$ before and after alignment. The upper plot of the third column shows the two signatures under comparison and the lower plot of the third column shows the alignment path. We note that the alignment is quite good regardless of the differences in the shapes of x(t) and y(t). The remaining mismatch between these signals accounts for the differences in shape of the signatures.

Figure 9A:
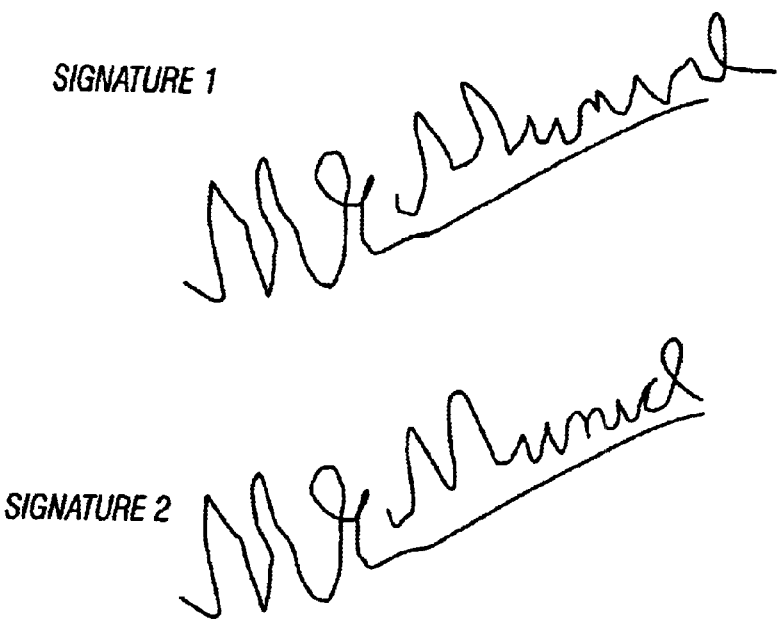
Figure 9B:
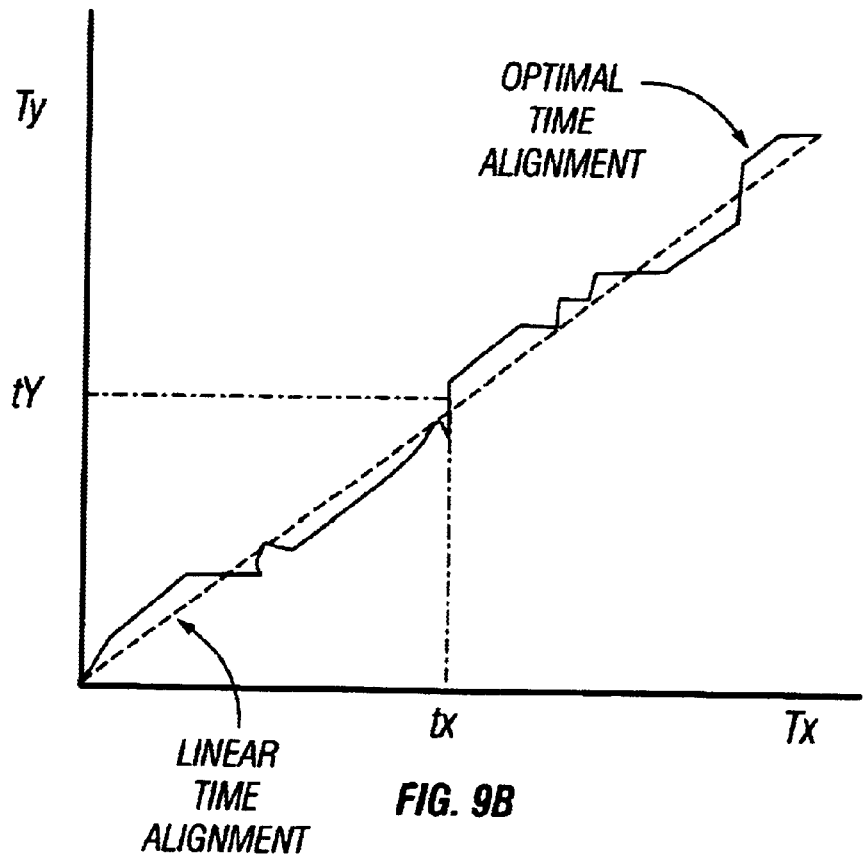
Figure 9C:
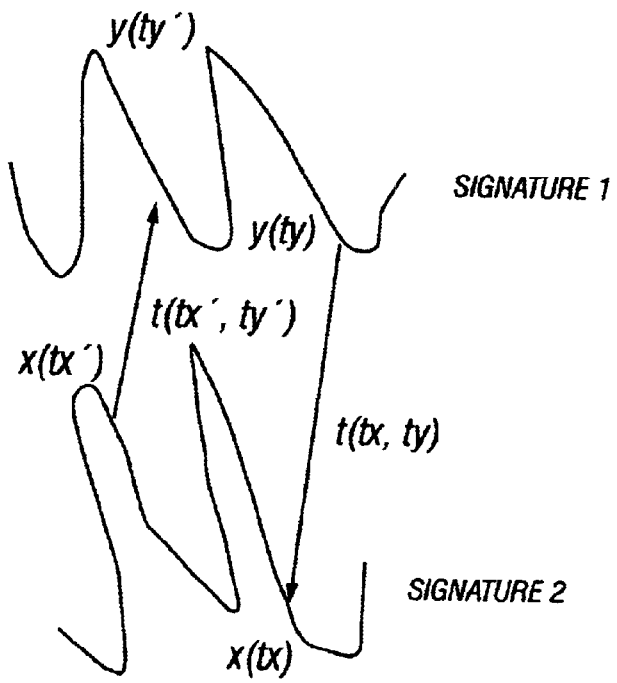
Figure 10A:
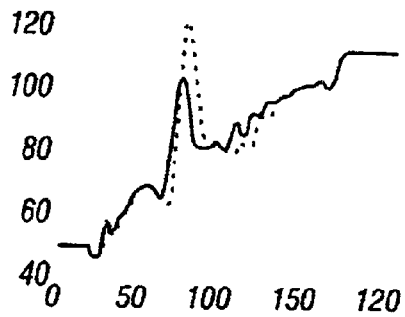
Figure 10B:
Figure 10C:
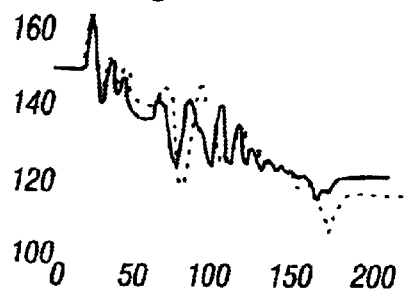
Figure 10D:
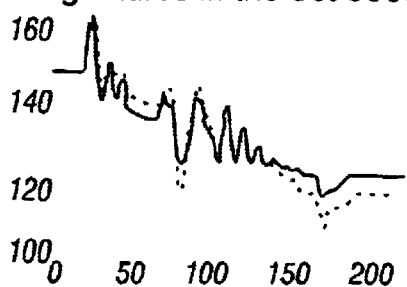
Figure 10E:
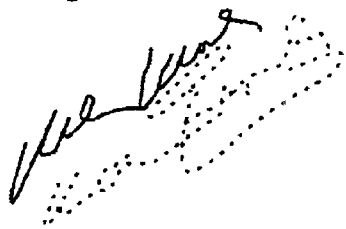
Figure 10F:
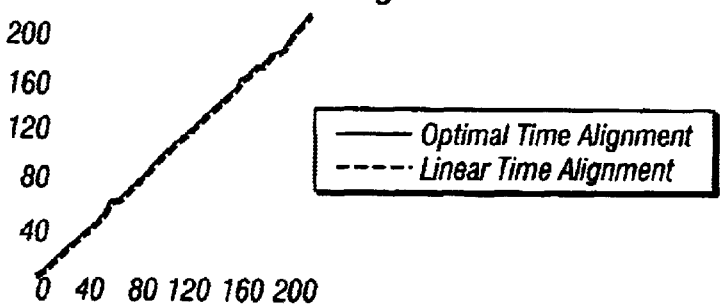

Dynamic time warping is a dynamic programming technique that performs alignment of two different examples of a signal. Given the two examples $X=(x(1), x(2), \ldots x(T_x))$ and $Y=(y(1), y(2), \ldots y(T_y))$, and a distance function $d(x(t_x), y(t_y))$, we can define the total dissimilarity between X and Y as follows $$D(X, Y) = \sum_{t=1}^{T} d(x(t), y(t)) \quad (2)$$

where the above summation is performed over a common time axis. In the simplest case of time alignment, i.e., linear time alignment, the above summation would be computed over one of the individual time axis $t_x$ or $t_y$ that would be related to each other by $t_x = T_x/T_y \, t_y$. This is graphically shown in FIGS. 9(a)–9(c).

Linear time alignment assumes that the rates of production of the signals are constant and proportional to the duration of the signals. It corresponds to the diagonal straight line shown in the $(t_x, t_y)$ plane of FIG. 9(b). In the general setting, signatures are generated at a variable rate showing local motion changes. Therefore, we need to obtain two warping functions $\phi_x$ and $\phi_y$ that relate the time indices of the examples with a common time axis. The accumulated distortion between X and Y in this case is $$D_\phi(X, Y) = \sum_{t=1}^{T} d(x(\phi_x(t)), y(\phi_y(t))) \quad (3)$$

with $\phi=(\phi_x, \phi_y)$. These warping functions define a warping path. Of all the possible warping functions that could be chosen, we would look for the one that minimize the distortion between X and Y:

$$D(X, Y) = \min_\phi \sum_{t=1}^{T} d(x(\phi_x(t)), y(\phi_y(t))) \quad (4)$$

The solution to this problem is obtained with a dynamic programming technique that relies on the following recursion:

$$D(t_x, t_y) = \min_{(t'_x, t'_y)} \{D(t'_x, t'_y) + c((t'_x, t'_y), (t_x, t_y))\} \quad (5)$$

where $D(t_x', t_y')$ is the cumulated cost of the best path ending at node $(t_x', t_y')$ and $c((t_x', t_y')\ (t\_x, t\_y))$ is the elementary cost of the arc joining nodes $(t_x', t_y')$ and $(t_x, t_y)$ in the warping plane.

From the above recursion equation, we can see that a simple algorithm yields the optimal path: for each node on the discrete plane $(t_x, t_y)$, the minimum cumulated cost is computed with equation (5). The node that provides the minimum cost is stored in memory. The cumulative cost is computed serially starting from the first column until the last column in the discrete plane $(t_x, t_y)$. Finally, the last column is searched for the node with minimum cost and then the optimum warping path is found by backtracking the stored nodes.

For the time alignment process to be meaningful in terms of time normalization for different realizations of a signature, some constraints on the warping functions are necessary. Unconstrained minimization in equation (5) may conceivably result in a near-perfect match between two signatures belonging to two different subjects, thus making the comparison meaningless for recognition purposes. Typical time warping constraints that are considered reasonable for time alignment include endpoint constraints, monotonicity conditions, local continuity constraints, global path constraints and slope weighting.

The preferred system enforces only a few simple constraints. First, the system preferably only allows monotonic paths to be explored, so if point $t_x$ is matched with point $t_y$, then point $t_x+1$ can only be matched with a point after point $t_y$. Preferably, we only allow point $(t_x, t_y)$ to be reached from points $(t_{x-1}, t_y)$, $(t_{x-1}, t_{y-1})$ and $(t_x, t_{y-1})$. We preferably require that the warping path start at point $(0,0)$ and end at point $(T_x, T_y)$. Finally, we constrain the number of points $t_y$ that can be explored for each point $t_x$ in minimizing the equation. With all these constraints, the algorithm can be summarized as follows:

$$D(t_x, t_y) = \min \begin{cases} D(t_x-1, t_y) + c(t_x-1, t_y), (t_x, t_y) \\ D(t_x-1, t_y-1) + c((t_x-1, t_y-1), (t_x, t_y)) \\ D(t_x, t_y-1) + c((t_x-1), (t_x, t_y)) \end{cases} \quad (6)$$

The only missing element in the algorithm is the specification of the elementary cost of the arc joining nodes $(t_x', t_y')$ and $(t_x, t_y)$, $c((t_x', t_y'), (t_x, t_y))$. Assume that the point $x(t_x')$ in the first signature is matched with point is $y(t_y')$ in the second signature, and that point $x(t_x)$ in the first signature is matched with point $y(t_y)$ in the second signature. The translation vectors associated with each match are $t(t_x', t_y') = x(t_x') - y(t_y')$ and $t(t_x, t_y) = x(t_x) - y(t_y)$. The error between matches is $d((t_x', t_y'), (t_x, t_y)) = t(t_x, t_y) - t(t_x', t_y')$. We choose the elementary cost to be the Euclidean norm of the error between matches: $c((t_x', t_y'), (t_x, t_y)) = d((t_x', t_y'), (t_x, t_y))^2$. This cost function tends to give minimum elementary cost to pair of places in the warping plane that corresponds to pairs of points in the signatures that have the same displacement vectors, providing zero cost in the case in which one signature is a translated version of the other.

Additional improvement in the comparision between signatures can be obtained using the following mathematical description.

In most of the mentioned previous work, a time-based parameterization of the functions to be aligned was used. To our knowledge, only Nalwa used an arc-length parameterization of the signatures for computing the characteristic functions proposed in his paper. The arc-length parameterization of the signature is loosely dependent on time and on the dynamics of signing, even though it keeps the causality of the signature's generation. This weak dependence on the dynamics of signing seems contrary to the traditional idea that the pen dynamics is a key element in detecting forgeries. However, the use of the arc-length parameterization is a first step towards achieving invariance with respect to Euclidean transformations of the signatures. Going one step further, we could use a parameterization that provides a certain degree of invariance with respect to affine transformations of the signatures. This parameterization has been described in the literature and has been called affine arc-length by Pollick and Sapiro.

Several studies show that the generation and perception of planar movements by humans follow a direct relationship between the tangential velocity of the hand and the radius of curvature of the planar curve.

Experimental results exhibit that the tangential velocity decreases as the curvature increases. A mathematical fitting of these results gives rise to a power law in which the tangential velocity is proportional to the ⅓ power of the radius of curvature. While the relationship between this two quantities is very intuitive, there is no clear explanation for the factor of ⅓ in the power law. It has been shown that this power law precisely implies motion at a constant affine velocity. This means that curves with equal affine length will be drawn in equal time.

A main question is why affine parameters seem to be embedded in the representation of planar motion. One possible explanation presented by Pollick & Shapiro notes that affine transformations are obtained when a planar object is rotated and translated in space, and then projected into the eye via parallel projection. This approximated model for the human visual system is valid when the object is flat enough and away from the eye, as in the case of drawing and planar point motions. The relations used to re-parameterize the signatures on Euclidean and affine arc-lengths are defined. A planar curve may be defined as the locus of points C(p)=[x(p), y(p)]∈ IR², with p ∈[0,1]. Given an increasing function q(p), the curve defined by C(q) will be the same as the one defined C(p), even though the velocities along the curve will be different. One of the parameterizations used in the experiments is the Euclidean arc-length defined such as the curve is traveled with constant velocity. Given the curve C, parameterized with an arbitrary parameterization p, in order to re-parameterize it in Euclidean arc-length, we use the relation $$v(p) = \int_o^p \left\|\frac{\partial C(t)}{\partial t}\right\| dt$$

The second parameterization used in the experiments is the affine arc-length s defined such as the area of the parallelogram determined by the velocity and the acceleration along the curve is constant. To re-parameterize the curve we use $$s(p) = \int_o^p \left\|\frac{\partial C}{\partial t} \times \frac{\partial^2 C}{\partial t^2}\right\|^{\frac{1}{3}} dt.$$

Although only a few embodiments have been described in detail above, other embodiments are contemplated by the inventor and are intended to be encompassed within the following claims. In addition, other modifications are contemplated and are also intended to be covered.

What is claimed is:

1. A writing implement touching detector system, comprising:
   a single image acquisition device, capable of being moved to a plurality of different locations relative to a writing implement, and producing an output indicative of a scene imaged by the single image acquisition device;
   a processor, responsive to said output from the single image acquisition device, and operating to detect when a writing implement that is in the scene and unconnected to said image acquisition device is touching an associated writing surface, and when said writing implement is not touching the writing surface based on only the output of the single image acquisition device, by using a stochastic model to obtain a probability that the writing implement is touching or not touching based on clues about the environment, and determining a best estimate probability based on the stochastic model to determine the likelihood whether the writing implement is touching; and the clues about the environment include shadows of the writing implement.

2. A system as in claim 1, wherein said processor also operates to recognize handwriting being traced by the implement.

3. A system as in claim 2, wherein said processor operates by:
   determining a positioning of the implement in the first frame;
   tracking a most likely position of a tip of the implement;
   excluding portions of the trajectory representing portions where the implement is not touching the surface; and
   recognizing the writing based on only portions where the implement is touching the surface.

4. A system as in claim 1, wherein said clues include whether ink is present at a location near the implement tip at either a time of writing or a time thereafter.

5. A system as in claim 4, wherein said processor investigates to look for ink near a previous position of the pen tip.

6. A writing implement touching detector system, comprising:
   a single image acquisition device, capable of being moved to a plurality of different locations relative to a writing implement, and producing an output indicative of a scene imaged by the single image acquisition device; and
   a processor, responsive to said output from the single image acquisition device, and operating to detect when a writing implement that is in the scene and unconnected to said image acquisition device is touching an associated writing surface, and when said writing implement is not touching the writing surface based on only the output of the single image acquisition device, by obtaining a probability that the writing implement is touching or not touching based on clues about the environment, and using a best estimate probability to determine the likelihood whether the writing implement is touching;
   wherein said clues include shadows of the implement and ink being present near the implement tip.

7. A method of determining a position of a writing implement relative to a writing surface, comprising:
   obtaining signal from a single image acquisition device, which can be oriented in any of a plurality of different orientations relative to the writing implement, indicative of a scene of the acquisition device;
   applying a stochastic model to the signal to obtain a probability that the writing implement is touching or not touching based on clues about the environment including shadows of the writing implement,
   determining a best estimate probability based on the stochastic model to determine the likelihood whether the writing implement is touching; and
   based on the best estimate, determining which parts of the scene represent portions where a writing implement is touching a writing surface and which parts of the scene represents portions where the writing implement is not touching the writing surface.

8. A method as in claim 1, further comprising using only those portions where the writing implement is touching the surface to define a trajectory of the writing implement.

9. A method as in claim 8, further comprising using said trajectory to recognize letters formed by the handwriting.

10. A method as in claim 9, wherein said using comprises determining an image of the writing implement;
   following the image of the writing implement through succeeding frames to define an overall trajectory;

excluding portions where the implement is not touching the surface from the overall trajectory, to define a modified trajectory.

11. A method as in claim 7, wherein said determining comprises:
   acquiring information about a current system;
   defining a model of probability which depends on said information; and
   using said model to determine whether the writing implement is touching the surface based on said model.

12. A method as in claim 11, wherein said acquiring information comprises determining a position of a tip of the writing implement, and determining if a trace of ink is left near said tip.

13. A method as in claim 12, wherein said determining is carried out at a time after the trajectory is determined.

14. A method as in claim 12, wherein said acquiring comprises investigating an image of a shadow, and determining from said shadow image the proximity of the implement to the surface.

15. A method as in claim 7, wherein said processing comprises investigating to find any trace left by the writing implement to determine a trace left by the writing implement to determine the positions in which the said writing implement was in contact with the writing surface.

16. A method as in claim 15, wherein said trace comprises a change to said writing surface.

17. A method of determining a position of a writing implement relative to a writing surface comprising:
   obtaining an output from a single image acquisition device, which can be oriented in any of a plurality of different orientations relative to the writing implement, indicative of a scene of the acquisition device; and
   processing the signal to determine which parts of the scene represent portions where a writing implement is touching a writing surface based on an analysis of changes in the image made by said writing implement, and which parts of the scene represents portions where the writing implement is not touching the writing surface;
   wherein said determining comprises:
      acquiring information about a current system including looking for ink traces on the paper and looking for shadow information;
      defining a model of probability which depends on said information; and
      using said model to determine whether the writing implement is touching the surface based on said model.

18. A method of signature verification, comprising:
   using an image acquisition device to obtain an image of a scene, said scene including a writing implement and a writing surface;
   from a position unconnected to a writing implement, following positions of the writing implement relative to the writing surface;
   defining a trajectory of a tip of said writing implement, including a path of said tip, and both down portions where the writing implement tip is touching the writing surface and up portions where the writing implement tip is not touching the writing surface;
   selecting a dynamic time warping function; and
   applying the dynamic time warping function to said trajectory which dynamic time warping function includes both said down portions where the writing implement tip is touching the surface, and up portions of the writing tip where the tip is not touching the surface and comparing the function to other trajectories to determine if said trajectory matches one of said other trajectories that would indicate a match between an entire trajectory including both said up and down portions, and outputting a result indicative thereof.

19. A method as in claim 18, further comprising parameterizing using an arc-length system using an image acquisition device to obtain an image of a scene, said scene including a writing implement and a writing surface;
   following positions of a writing implement relative to the writing surface;
   defining a trajectory of a tip of said writing implement, including both down portions where the writing implement tip is touching the writing surface and up portions where the writing implement tip is not touching the writing surface; and
   comparing said trajectory to other trajectories to determine if said trajectory matches one of said other trajectories that would indicate a match, and outputting a result indicative thereof.

20. A method of signature verification, comprising:
   using an image acquisition device to obtain an image of a scene, said scene including a writing implement and a writing surface;
   following positions of a writing implement relative to the writing surface;
   defining a trajectory of a tip of said writing implement, including at least up portions where the writing implement tip is not touching the writing surface;
   selecting a time warping function that minimizes cost of aligning said trajectory including both said down portions where the writing implement tip is touching the surface, and up portions of the writing tip where the tip is not touching a surface, comparing said function to other functions of other trajectories including both said down portions where the writing implement tip is touching the surface, and up portions of the writing tip where the tip is not touching the surface and
   applying the dynamic time warping function to compare said trajectory to said other trajectories to determine if said trajectory matches one of said other trajectories between an entire trajectory including both said up and down portions, and outputting a result indicative thereof.

* * * * *